(12) United States Patent
Ji et al.

(10) Patent No.: US 10,300,410 B2
(45) Date of Patent: May 28, 2019

(54) ADVANCED LIQUID CENTRIFUGE USING DIFFERENTIALLY ROTATING CYLINDERS AND OPTIMIZED BOUNDARY CONDITIONS, AND METHODS FOR THE SEPARATION OF FLUIDS

(71) Applicant: The Trustees of Princeton University, Princeton, NJ (US)

(72) Inventors: Hantao Ji, Plainsboro, NJ (US); Adam Cohen, Princeton Junction, NJ (US); Phil Efthimion, Bedminster, NJ (US); Eric Edlund, Princeton, NJ (US); Erik Gilson, Princeton, NJ (US)

(73) Assignee: THE TRUSTEES OF PRINCETON UNIVERSITY, Princeton, NJ (US)

(*) Notice: Subject to any disclaimer, the term of this patent is extended or adjusted under 35 U.S.C. 154(b) by 880 days.

(21) Appl. No.: 14/635,701

(22) Filed: Mar. 2, 2015

(65) Prior Publication Data

US 2015/0246364 A1 Sep. 3, 2015

Related U.S. Application Data

(60) Provisional application No. 61/946,940, filed on Mar. 3, 2014.

(51) Int. Cl.
| | | |
|---|---|---|
| *B04B 1/00* | (2006.01) | |
| *B04B 9/00* | (2006.01) | |
| *B01D 21/00* | (2006.01) | |
| *B01D 21/26* | (2006.01) | |
| *B01D 21/34* | (2006.01) | |
| *B04B 11/02* | (2006.01) | |

(52) U.S. Cl.
CPC ....... *B01D 21/262* (2013.01); *B01D 21/0087* (2013.01); *B01D 21/34* (2013.01); *B04B 1/00* (2013.01); *B04B 9/00* (2013.01); *B04B 11/02* (2013.01)

(58) Field of Classification Search
CPC .. B01D 21/262; B01D 21/34; B01D 21/0087; B04B 9/00; B04B 11/02; B04B 1/00
USPC .................................. 494/37, 44, 76, 77, 79
See application file for complete search history.

(56) References Cited

U.S. PATENT DOCUMENTS

| | | | | |
|---|---|---|---|---|
| 3,695,509 A | * | 10/1972 | Javet ................. | B01D 17/0217 494/43 |
| 5,428,220 A | * | 6/1995 | Ehara ..................... | B04B 5/08 250/281 |
| 7,077,799 B2 | * | 7/2006 | Gorham ................... | B04B 1/06 494/37 |

OTHER PUBLICATIONS

Development of a Couette-Taylor Flow Device with Active Minimization of Secondary Circulation, by E. Shartman, et al., Review of Scientific Instruments, 80, 024501 (2009).*

* cited by examiner

*Primary Examiner* — Walter D. Griffin
*Assistant Examiner* — Shuyi S. Liu
(74) *Attorney, Agent, or Firm* — Norris McLaughlin, PA

(57) ABSTRACT

Provided is an advanced liquid centrifuge using differentially rotating cylinders moveable rings at the ends thereof, as well as methods for the separation of fluids, preferably liquids.

16 Claims, 13 Drawing Sheets

ADVANCED LIQUID CENTRIFUGE USING DIFFERENTIALLY ROTATING CYLINDERS AND OPTIMIZED BOUNDARY CONDITIONS, AND METHODS FOR THE SEPARATION OF FLUIDS

The application claims priority benefit to U.S. Ser. No. 61/946,940 filed on 3 Mar. 2014, the entirety of said prior application is herein incorporated by reference.

This invention was made with government support under Grant #DE-AC02-09CH11466 awarded by the U.S. Department of Energy. The U.S. Government has certain rights in this invention.

The separation of fluids, such as liquids, into two or more component fractions or parts are extremely important to many technical processes, including but not limited to industrial processes and medical processes. Additionally, the formation of fluids, particularly liquids, into mixtures or suspensions from two or more component fractions or parts are also extremely important to many technical processes as well.

Known to the art are a variety of centrifugal separators (sometimes referred to as "contactors") which provide one or more these foregoing functions. Most of these belong to the category of "solid-body" centrifugal separators wherein the apparatus includes a cavity containing (where adapted to contain) a composition in which separation of a liquid into two more component fractions or parts is caused to occur due to the rotation of the solid-body unit. For example, separation of blood and/or fractionation of other liquids are very successfully performed using rotating solid-body type centrifugal separators.

U.S. Pat. No. 3,971,510 to Theodore Frederick Morse discloses an ultracentrifuge of the solid-body type useful in the separation of gases, particularly those of high molecular weight. Through the introduction of an inner cylinder within the outer cylinder of a high speed centrifuge, a higher over-all flow profile efficiency is created. In addition, although a gain of lesser significance, the vacuum core present in ultra centrifuges, which does not contribute to the separative power of the centrifuge, is virtually eliminated. Moreover, for those gases in which the maximum pressure in the centrifuge is limited by a phase change, i.e. the maximum pressure in the centrifuge must be kept below the vapor pressure, the addition of the inner cylinder raises the pressure in the central core region by several orders of magnitude, which permits the subsequent reduction of pressure on the outer walls of both inner and outer cylinders without any portion of the centrifuge being in the Knudsen regime. With this reduction of pressure on the outer walls, the gas can then be centrifuged at a lower temperature, thus further increasing the productive capacity of such a device.

U.S. Pat. No. 3,998,610 to William Leith discloses a rotating concentric homogeneous turbulence gas centrifuge of the solid-body type and a method for the separation of isotopic gaseous mixtures, particularly for the enrichment of uranium by the evaporative, concurrent-flow and counter-current-flow principles using Taylor circular Couette motion. Gaseous isotopes either alone or mixed with a carrier gas, more particularly uranium isotopes in mixture with uranium hexafluoride carrier gas, are fed to a rotor assembly of a gas centrifuge which comprises two concentric cylinders which may be rotated at the same or at different angular velocities and in the same or opposite directions to create centrifugal forces sufficient to diffuse the heavier fraction of the gas mixture to the periphery of the assembly and the lighter fraction towards the axial portion of the assembly. The rotor comprises an inner, perforated rotatable cylinder and an outer, continuous smooth-walled, rotatable cylinder concentric with the inner cylinder and defining an annulus (or, chamber) therebetween. Leith's centrifuge and its manner of operation are however limited to separation of gaseous mixtures and no mention is made of any utility or method in the separation of non-gaseous fluids, viz., liquids. Furthermore Leith's disclosure is suspect as while Leith asserts that wherein his gas centrifuge when operating such that the inner, perforated cylinder is 1 to 3.3 times faster than the outer cylinder, and that under such an operating condition vortices would be formed (as a consequence of Taylor-Couette flow characteristics) which would enhance gas residence time and improve separation efficiency. However, such is inconsistent with a skilled artisan's understanding that such vortices would tend to reduce separation efficiency of gases by providing a mechanism for radial transport which would enhance the mixing of constituents, and not their separation, as the Taylor vortices would extend peripherally and concentrically within the annulus between the perforated, inner cylinder and the outer cylinder.

Various studies relating to the fluid flow characteristics of fluid flow characteristics between two rotating cylinders, more particularly in the annulus between the outer wall of the inner cylinder (IC) and the inner wall between the outer cylinder (OC) and between two or more rotatable end rings have been undertaken. These include: *Numerical and Experimental Investigation of Circulation in Short Cylinders*, by Akira Kagemaya, et al., Journal of the Physical Society of Japan, Vol. 73, No. 9, pp. 2424-2437 (2004); *Development of a Couette-Taylor Flow Device with Active Minimization of Secondary Circulation*, by E. Schartman, et al., Review of Scientific Instruments, 80, 024501 (2009); and Nonlinear Stability of Laboratory quasi-Keplerian Flows, by E. M. Edlund, et al., Physical Review E 89, 021004 (2014). These papers provide discussions of scientific investigations of the internal fluid flow characteristics of the liquid between a rotating inner cylinder and a rotating outer cylinder, and which further included one or more rotatable rings in the space between the ends of the said inner and outer cylinders. The papers fail to discuss any practical applications of the fluid flow behavior.

Notwithstanding the availability of certain types of separation equipment which may be used to separate liquids into two or more component fractions or parts, there exits a continuing need in the art for improved separation equipment, methods for their use, and improved processes for the separation of compositions, especially liquids into two or more component fractions or parts. There also exists a need in the art for apparatus, and methods for the separation of liquid compositions from two or more component fractions or parts.

Figure 1:
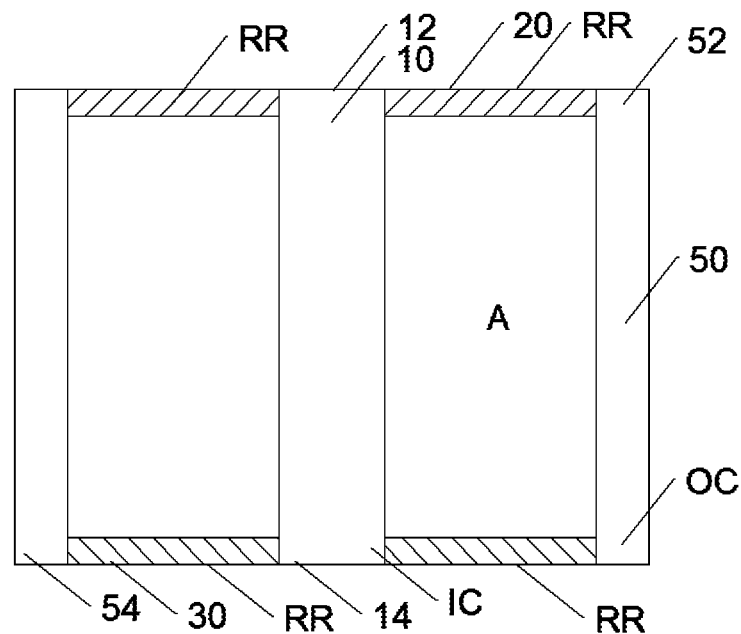
FIGS. 1, 2, 3 and 4 illustrate various embodiments of apparatus useful in methods according to the invention.

In a first aspect the present invention provides an apparatus for the separation of a composition (preferably non-gaseous fluid, and/or other materials) into two more fractions or parts, which apparatus comprises an annulus (or, chamber) for the containment of a composition which annulus exists between a rotatable inner cylinder ("IC"), a rotatable outer cylinder ("OC"), and one or more rotatable rings ("RR") which extend between the inner cylinder and the outer cylinder and particularly at or near the ends thereof. These aforesaid elements, viz., the inner cylinder, the outer cylinder and the one or more rotatable rings are all independently mobile, preferably rotatable, with respect each other. Preferably these elements are joined to adjacent elements by suitable liquid tight seals such that a liquid can be retained within the annulus when one or more of these elements are in motion. Preferably, the inner cylinder, the outer cylinder, and the one or more rotatable rings are all concentric about a central axis, which may be oriented at any angle, but is preferably horizontally, diagonally or vertically oriented. The foregoing elements may be contained in a vessel and/or frame to retain them in an operative configuration. The apparatus may further include suitable drive means which are used to impart motion, preferably rotational motion to the elements, and preferably one or more suitable drive means are provided and coupled so that motion of each of the inner cylinder, the outer cylinder, and each of the one or more rotatable rings may be impelled or driven to move or to rotate independently of other elements also present in the apparatus. The apparatus further includes a one or more liquid ports whereby the contents of the annulus may be provided and/or removed, respectively, to or from the apparatus. One or more liquid ports may be used to supply a composition to the annulus of the apparatus, and one or more liquid ports may be used to remove composition from the annulus of the apparatus. These liquid ports may be the same or different. One or more of the liquid ports may be connected to a passage, pipe, tube or manifold or other fluid transport means. One or more fluid pumps may be used in conjunction with the apparatus. The apparatus may further include appropriate pump controllers, to control the operative characteristics of the pumps and/or the apparatus. The apparatus may further include appropriate drive controllers, to control the operative characteristics of the drive means. The apparatus may include suitable power and control circuitry, e.g, to control the operation of the pump controllers, the drive controllers and/or further parts of the apparatus. A general purpose controller may be used to control one or more of the pumps and/or drive means and/or the apparatus, which general purpose controller may be used to control the overall steps in a separation process performed utilizing the apparatus. Alternately the operation of one or more elements of the apparatus may be manually controlled by an operator.

In a second aspect there is provided a method for the separation of a composition, (preferably which is, or which includes a liquid) into two or more component fractions or parts, which method comprises the steps of:

providing the composition to an apparatus which comprises an annulus for the containment of a composition which annulus exists between an a rotatable inner cylinder (IC), a rotatable outer cylinder (OC), and one or more rotatable rings which extend between the inner cylinder and the outer cylinder, which aforesaid elements are all independently mobile, preferably rotatable, with respect each other, such that a liquid can be retained within the annulus when one or more of these elements are in motion, and preferably wherein, the inner cylinder, the outer cylinder, and the one or more rotatable rings are preferably all concentric about a central axis, about which they may move;

operating the apparatus in such a manner that the rotational speed of at least one of the inner cylinder, outer cylinder and one or more rotational rings move at a speed, e.g. rotational velocity which is different from the speed of one or more of the other inner cylinder, outer cylinder and one or more rotational rings present within the device such that over an interval of time, the distribution of components present within a composition between the inner cylinder and the outer cylinder changes due to the motion of one or more of the elements of the apparatus (separation), and, optionally but preferably, withdrawing from the annulus two different separation products, which have different compositions and/or concentrations of one or more of the components previously provided to the apparatus and prior to the separation.

In the method, the separation under the influence of the operation of the apparatus may occur due to differences in the densities of the two or more component fractions or parts present in the compositions acted on by the method.

Optionally but very preferably the apparatus used in the method further includes a one or more liquid ports whereby the contents of the annulus may be provided and/or removed, respectively, to or from the apparatus, particularly the annulus. One or more liquid ports may be used to supply a liquid and/or other to the annulus of the apparatus, and one or more liquid ports may be used to remove composition from the annulus of the apparatus. These liquid ports may be the same or different.

In a third aspect the present invention provides a method for the mixing of two or more separate compositions (preferably at least one of which is, or which includes a liquid) to form a mixture, (preferably a homogenous or uniform mixture) which method comprises the steps of:

providing the separate compositions to an apparatus which comprises an annulus for the containment of a composition which annulus exists between an inner cylinder (IC), an outer cylinder (OC), and one or more rotatable rings (RR) which extend between the inner cylinder and the outer cylinder, which aforesaid elements are all independently mobile, preferably rotatable, with respect each other, and in which a liquid tight seal is present between adjacent elements such that a liquid can be retained within the annulus when one or more of these elements are in motion, and preferably wherein, the inner cylinder, the outer cylinder, and the one or more rotatable rings are preferably all concentric about a central axis, about which they may move;

operating the apparatus in such a manner that the rotational speed of at least one of the inner cylinder, outer cylinder and one or more rotational rings move at a speed, e.g. rotational velocity which is different from the speed of one or more of the other inner cylinder, outer cylinder and one or more rotational rings present within the device such that over an interval of time, the distribution of components (mixture) present within a composition between the inner cylinder and the outer cylinder changes due to the motion of one or more of the elements of the apparatus, and, optionally but preferably withdrawing from the annulus one or more mixture product(s) formed within the annulus from the separate compositions previously provided to the apparatus and prior to the separation.

Optionally but very preferably the apparatus used in the method further includes a one or more liquid ports whereby the contents of the annulus may be provided and/or removed, respectively, to or from the apparatus, particularly the annulus. One or more liquid ports may be used to supply a liquid and/or other to the annulus of the apparatus, and one or more liquid ports may be used to remove composition from the annulus of the apparatus. These liquid ports may be the same or different.

In a fourth aspect the present invention provides a method for performing a chemical reaction and/or enhancing, and/or controlling a chemical reaction within a composition (preferably which includes, or which is a liquid) which method comprises the steps of:

providing one or more compositions to an apparatus which comprises an annulus for the containment of a composition which annulus exists between an inner cylinder (IC), and outer cylinder (OC), and one or more rotatable rings (RR) which extend between the inner cylinder and the outer cylinder, which aforesaid elements are all independently mobile, preferably rotatable, with respect each other, and in which a liquid tight seal is present between adjacent elements such that a liquid can be retained within the annulus when one or more of these elements are in motion, and preferably wherein, the inner cylinder, the outer cylinder, and the one or more rotatable rings are preferably all concentric about a central axis, about which they may move;

operating the apparatus in such a manner that the rotational speed of at least one of the inner cylinder, outer cylinder and one or more rotational rings move at a speed, e.g. rotational velocity which is different from the speed of one or more of the other inner cylinder, outer cylinder and one or more rotational rings present within the device such that during the operation of the apparatus, one or more chemical reactions occur within the annulus to form one or more reaction products, optionally but preferably withdrawing from the annulus one or more mixture product(s) formed within the annulus from the separate compositions previously provided to the apparatus and prior to the separation.

Optionally but very preferably the apparatus used in the method further includes a one or more liquid ports whereby the contents of the annulus may be provided to and/or removed from the apparatus, particularly the annulus. One or more liquid ports may be used to supply a composition to the annulus of the apparatus, and one or more liquid ports may be used to remove a composition from the annulus of the apparatus.

According to a fifth aspect of the invention, the method according to the second aspect is performed, and additionally during the method, one or more chemical reactions occur within the annulus to form one or more reaction products, which chemical reactions may occur before and/or during and/or subsequent to the separation and/or mixing due to the motion of one or more of the elements of the apparatus. Preferably such one or more chemical reactions occur during and/or subsequent to the operation of the apparatus in the separation of components within the annulus.

According to a sixth aspect of the invention, the method according to the third aspect is performed, and additionally during the method, one or more chemical reactions occur within the annulus to form one or more reaction products, which chemical reaction(s) may occur before and/or during and/or subsequent to the formation of the mixture within the annulus due to the motion of one or more of the elements of the apparatus.

In accordance with any of aspect of the invention disclosed herein, the apparatus may be horizontally or vertically oriented during the operation of the apparatus. Also, optionally the foregoing elements may be contained in a vessel and or frame to retain them in an operative configuration. The apparatus may further include suitable drive means which are used to impart motion, preferably rotational motion to the elements, and preferably one or more suitable drive means are provided and coupled so that motion of each of the inner cylinder, the outer cylinder, and each of the one or more rotatable rings may be impelled or driven to move or to rotate independently of other elements also present in the apparatus. The apparatus may further include appropriate drive controllers, to control the operative characteristics of the apparatus. Such drive controllers may include suitable power and control circuitry in order to control the operation of the drive means.

These and further aspects of the invention are described more fully in the further parts of this patent specification.

The apparatus of the invention may be used to provide both mixing and/or separation within the annulus (or, chamber). The apparatus may be constructed, configured and/or operated to promote reduced amplitude of turbulent motions and secondary circulations by special choice of the fluid boundary conditions, particularly at the region at the ends of the inner cylinder and outer cylinder. These conditions may be modified or controlled by the operational characteristics of one or more rotatable rings ("RR") present at near an end of the inner cylinder ("IC") and an end of an outer cylinder ("OC"). One or more RR are present at each end of each of the IC and the OC. Control over the motion, viz., rotational speeds, of the IC, OC and RR are used to control the fluid flow characteristics within the annulus.

Taylor-Couette motion occurs in the annulus between the concentric rotating IC and OC, and is caused by the laminar friction of the liquid between the wall of the IC and the wall of the OC. In prior art, "solid-body" centrifugal separators the Taylor-Couette motion deteriorates in the proximity of the ends of the IC and OC which in turn compromises the separation efficiency of such centrifugal separators, as non-ideal Couette flow profiles exist in these ends of the IC and OC. This is not overcome even by providing inwardly extending flanges at the ends of the IC and/or OC which flanges co-rotate with the IC and/or OC. The apparatus of the present invention and methods of the present invention provide improved separation efficiencies unknown to the prior art, and also provide improved mixing characteristics also unknown to the prior art, due to the control of the relative rotational rates of the IC relative to the OC, and the provision of one or more rotatable rings ("RR") which extend between the inner cylinder and the outer cylinder (which may or may not include inwardly extending flanges) and particularly at or near the ends thereof and which RR may move, preferably rotate at a different speed than that of the IC and/or OC, as well as methods of operation of the apparatus. The provision of RR permits for improved control of the fluid flow characteristics present with in the annulus such that said characteristics better approach or attain ideal Couette flow profiles in the regions proximate at the these ends of the IC and OC. The provision of RR also permits for the improved separation of composition into two or more component fractions or parts as compared to prior art "solid-body" centrifugal separators. Such a composition, e.g, a gas, may include two or more components having different densities and/or molecular weights. Additionally the provision of RR also permits for the improved mixing of the contents of the annulus of the apparatus, if such is desired as may be the case where intimate mixing of two or more components or materials is desired.

The inventors have surprisingly found that in preferred embodiments of the invention, that the apparatus and methods operate such that the formation of undesired Taylor vortices is minimized or avoided, and at the same time that secondary flow characteristics, typically occurring in a plane or direction perpendicular but coaxial to the IC and/or the OC, e.g, Ekman flow, is minimized or avoided thus leading to superior control of the contents of the annulus particularly when the apparatus is operated to separate a fluid. The provision and use of the RR, particularly when operating at speeds intermediate to the IC and OC provides such a benefit, particularly when the relative rotational rate (in rpm) of the IC relative to the OC is from about that of the OC to no greater than that of the OC multiplied by the square of the ratio of the OC diameter to the IC diameter, preferably is within about +/−25%, more preferably about +/−10% of the rotational rate of the OC multiplied by the square of the ratio of the OC diameter to the IC diameter. The relative rotational speed or rate of the IC relative to the OC within the above limits and the concurrent operation of RR which permits for the fluid within the annulus to approximate the theoretically calculated Taylor-Couette flow profile without however leading to the formation of Taylor vortices which undesirably produce mixing within such vortices and also to control, limit or eliminate undesired secondary flow conditions. The theoretically calculated Taylor-Couette flow profile value ($\Omega(r)$) of a fluid present between the IC and the OC at any specific point corresponding to a radial distance 'r' between the outer wall of the inner cylinder and the inner wall of the outer cylinder can be determined from the following equation:

$$\Omega(r) = a + \frac{b}{r^2} \text{ in which}$$

$$a = (\Omega_2 r_2^2 - \Omega_1 r_1^2)/(r_2^2 - r_1^2) \text{ and}$$

$$b = r_1^2 r_2^2 (\Omega_1 - \Omega_2)/(r_2^2 - r_1^2)$$

wherein:
  $r_1$ is the radius of the outer wall of the IC,
  $r_2$ is the radius of the inner wall of the OC,
  $\Omega_1$ is the angular rotation rate of the IC,
  $\Omega_2$ is the angular rotation rate of the OC.
In preferred embodiments during the operation of the apparatus during a separation method, the actual fluid profile within the apparatus at a specific point or a specific radius, is within 25% (preferably, in order of increasing preference 20%, 15%, 12.5%, 10%, 9%, 8%, 7%, 6%, 5%, 4%, 3%, 2%, 1%, 0.5%) of the theoretically calculated Taylor-Couette flow profile at the same specific point or specific radius. Said specific point or a specific radius may be any point or radius between the IC and the OC, and/or said specific point may be at any point between the opposite ends of the IC and the OC. The said value of the actual fluid profile within the apparatus at a specific point or a specific radius may be based on a single value at the specific point or specific radius, or may be the averaged value at the specific point or specific radius, or may be the mean or median of a number of sampled readings or determination of the actual fluid flow profile at the specific point or specific radius, which readings may be taken a single time, or over a period of time such as time interval. The said value of the actual fluid profile may also be a based on a numerically averaged value or numerical approximation (e.g, statistical analysis, regression analysis) based on a plurality of values of the actual fluid flow profile. Non-limiting examples of such a curve-fit include: least-square fit, etc. Any currently accepted technique for numerical analysis may be applied and used in order to provide a useful value for the observed fluid flow profile, which may then be used and evaluated against the theoretically calculated Taylor-Couette profile. Advantageously, a time interval may be as little as 0.01 seconds between sampled readings but may be a great time interval as well, e.g 0.1 seconds, or 1, 2, 3, 4, 5, 10, 15, 20, 30, 45, 60, 90, 120, 180, 360, 600 seconds, or any other interval between sampled readings or determination of the actual fluid flow profile at the specific point or specific radius in the annulus during the operation of the apparatus.

By operating the inner cylinder ("IC") rotational speed larger than and in the same direction as the outer cylinder ("OC"), and concurrently when the one or more rotatable rings ("RR") also rotate at a speed which equal to, but is/are preferably intermediate to one or both of the IC and OC, the internal fluid forces acting can be substantially increased leading to enhanced separation efficiency of the contents of the annulus as ideal or near-ideal Couette fluid flow characteristics may be established within the annulus and between ends of the annulus. Such operating conditions may be used to establish a radial concentration gradient of the compositions present in the annulus which is much more uniform between the ends of the annulus than possible with prior art "solid-body" centrifugal separators, with heavier components, parts or fractions thereof being distributed near the inner wall of the OC, and with the lighter components, parts or fractions thereof being distributed near the outer wall of the IC, and which distributions profiles may be more uniform between the ends of the IC and the OC than previously possible with prior art "solid-body" centrifugal separators. Such may also give rise to different density distributions of the contents of the annulus as a function of the radial distance from the IC and OC.

The apparatus and methods of the invention also provide for improved mixing processes, and also improved separation processes which may be performed sequentially within the annulus of the apparatus.

The apparatus and methods of the invention also provide for the operation of an apparatus as disclosed herein wherein the contents of the annulus may be subjected to turbulent fluid flow characteristics, as well as to laminar fluid flow characteristics, including ideal and near-ideal Taylor-Couette fluid flow characteristics.

The apparatus and methods of the invention also provide for improved separation as the motion of the RR relative to the IC and the OC may be controlled such that a fraction of the contents within the annulus rotates with the IC and the rest rotates with the OC and the specific fraction is chosen to optimize the performance of the system in terms of separation efficiency and/or mixing efficiency. This is influenced by the relative motion, e.g., rotational speed(s), of the RR (one or more of which may be present) relative to that of the IC and to that of the OC. If two or more RR are present then their relative motion, e.g, rotational speed(s) also influence the performance of the system in terms of separation efficiency and/or mixing efficiency.

One preferred separation method according to the invention includes the following process steps:
(1) injecting, providing a composition into the annulus of the apparatus;
(2) rotating the various components of the apparatus in a direction, and velocity which is optimized to provide separation of components present within the composition;
(3) optionally, modifying the rotation of the various components of the apparatus of step (2) in order to impart a different internal fluid flow characteristics within the annulus of the apparatus;

(4) extracting two more fractions or parts of the composition initially present in the composition from the annulus of the apparatus;

(5) repeating steps (1)-(4) in the same apparatus, or in a subsequent apparatus.

Each of the inner cylinder (IC), the outer cylinder (OC) and the one or more rotational rings (RR) may concurrently move in the same or may move different directions. In a preferred embodiment both the IC and the OC move in the same rotational direction (e.g, clockwise or counterclockwise) and concurrently the one or more RR move in the same rotational direction of the IC and OC as well. In a further preferred embodiment both the IC and the OC move in the same rotational direction and concurrently the RR (or at least one RR when a plurality of rotational rings are present) move in the opposite rotational direction. In a third preferred embodiment, the IC moves in a rotational direction opposite to that of the OC, and concurrently the RR moves in the same direction as either the IC or the OC. In a fourth preferred embodiment the IC moves in a rotational direction opposite to that of the OC, and concurrently the RR between one end of the IC and the corresponding end of the OC moves in the same rotational direction as that of the IC, while the RR between the opposite end of the IC and the opposite end of the OC moves in the same rotational direction of the OC, viz., contrary to the direction of rotation of the other RR at the opposite end of the annulus. In a fifth preferred embodiment, one or both of the RR at the opposite ends of the annulus in an apparatus as described herein comprise two or more separate rotatable rings present between corresponding ends of the IC and OC, and each of the separate rotatable rings may move at a speed and/or direction being the same as or different that that of the adjacent rotatable ring. For example, an apparatus may be provided having a first RR comprised of two separate rotatable rings between one end of the IC and the corresponding end of the OC, and a second RR comprised of a further two separate rotatable rings between the other end of the IC and the corresponding other end of the OC. In such, each of the two separate rotatable rings providing the first RR may move at an independent speed and/or direction different that that of the other, and likewise each of the two separate rotatable rings providing the second RR may move at an independent speed and/or direction different that that of the other, and each of the rotatable rings present in the first RR and the second RR may move at a speed and/or direction independent of any other element present, including the IC and the OC. This foregoing principle of the fifth embodiment also applies to any embodiment of the apparatus wherein the RR comprises a single, or any plurality of separate rotatable rings.

Examples of various embodiments of an apparatus according to the invention are illustrated in the following figures. In the drawing figures, common elements are indicated utilizing like numbered or lettered elements in the various drawing figures.

Figure 2:
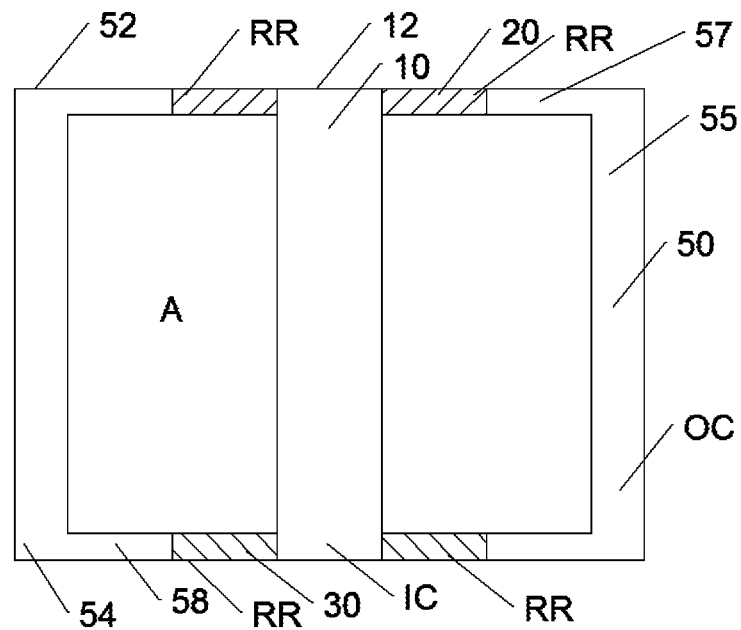
Figure 3:
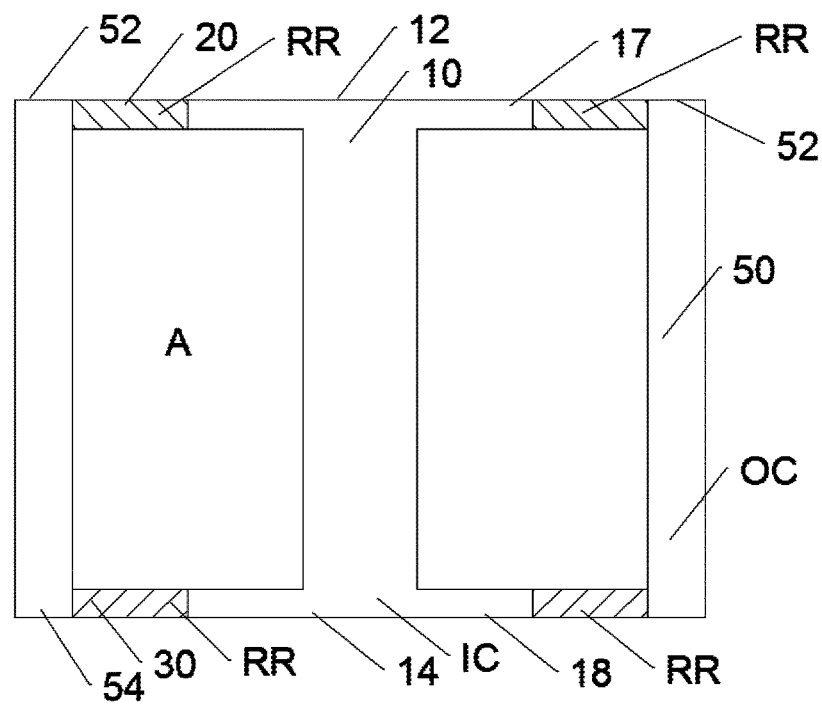

FIGS. 1, 2, and 3 illustrate cross-sectional views of various possible embodiments of the an inner cylinder IC, the outer cylinder, OC, and rotatable rings RR which may form part of an apparatus according to the invention, and which may be used in accordance with one or more methods of the invention. In each of these figures, there is provided a central inner cylinder 10, and outer cylinder 50, and between the upper end 12 of the inner cylinder 10 and the upper end 52 of the outer cylinder 52 is present a single upper rotatable ring 20 which extends therebetween. A separate single lower rotatable ring 30 is also present extending between the lower and 14 of the inner cylinder 10 and the lower end 54 of the outer cylinder 50. Each of the foregoing elements is independently mobile around each other, e.g., may be rotated about a central axis considered as passing through the central inner cylinder 10. While not specifically illustrated, it is understood that a fluid tight seal is formed between adjacent elements, yet, motion with respect to an adjacent element is preserved. These foregoing elements also define the annulus A which is bounded by these foregoing elements.

The embodiment of FIG. 2 is substantially similar to that of FIG. 1, but differs with respect to the configuration of the outer cylinder (OC) 50, in that in addition to the outer sidewall 55, there are also present inwardly extending portions or flanges 57, 58 respectively forming a part of the upper end 52 and lower end 54 of the outer cylinder 50, and respectively abut the upper rotatable ring 20 and the lower rotatable ring 30. The flanges 57, 58 are integrally formed, or fixed to the outer sidewall 55, and thus rotate with the outer cylinder 50. Again all of the foregoing elements are independently movable with respect to each other, and are concentric about a central axis (not shown) which can be considered as passing through the center line of the inner cylinder 10.

The embodiment of FIG. 3 is substantially similar to that of FIG. 1, but differs with respect to the configuration of the inner cylinder 10. In this embodiment, the inner cylinder includes outwardly extending portions or flanges 17, 18, respectively at the upper end 12 and the lower end the lower end 14 of the inner cylinder 10, which prospectively rebut the upper rotatable ring 20 and the lower rotatable ring 30.

Figure 4:
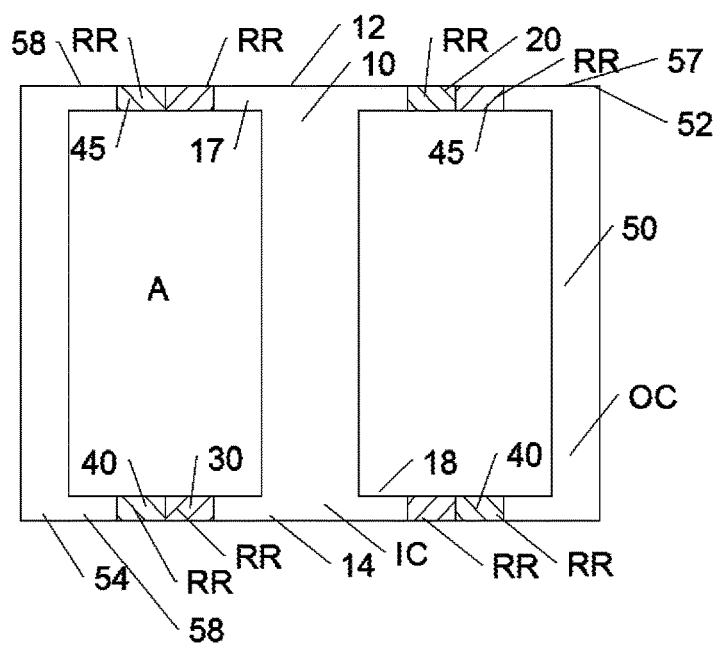

FIG. 4 illustrates a further embodiment by similar to that of prior FIGS. 2 and 3 in that there are present both present inwardly extending portions or flanges 57, 58 respectively forming a part of the upper end 52 and lower end 54 of the outer cylinder 50, as well as outwardly extending portions or flanges 17, 18, respectively at the upper end 12 and the lower end the lower and 14 of the inner cylinder 10, each of which abut at least one rotatable ring RR. In the present embodiment, there are present: an upper rotatable ring 20 adjacent to the flange 17 of the upper end 12, and a second upper rotatable ring 45 intermediate the upper rotatable ring 20 and flange 57; and further, a lower rotatable ring 30 adjacent to the flange 18, and a second lower rotatable ring 40 intermediate the lower rotatable ring 30 and the flange 58. As with the following figures, each of the elements are in a movable, you fluid tight relationship with adjacent elements, and the elements defined within the interior the annulus A.

In any of the foregoing each of the elements may move in a direction independently of any adjacent element. Advantageously however both the inner cylinder IC and the outer cylinder OC move in the same direction, e.g, clockwise or counterclockwise. Also advantageously, at least one but preferably at least two rotatable rings RR rotate in the same direction as either the inner cylinder IC or the outer cylinder OC, but preferably both. Where a plurality of rotatable rings present at either end, the direction of motion, e.g, the direction of rotation and/or rate of motion may be the same as, or different than the adjacent rotatable rings present. Preferably these elements are joined to adjacent elements by suitable liquid tight seals such that a liquid can be retained within the annulus when one or more of these elements are in motion. Preferably the inner cylinder, the outer cylinder, and the one or more rotatable rings are all concentric about a central axis While each RR present between an IC and OC may move in the same direction and at the same speed as the IC or the OC, preferably each RR moves at a speed intermediate the IC and the OC. In preferred embodiments the relative rotational rate (in rpm) of the IC relative to the OC is from about that of the OC to no greater than that of rate of the OC multiplied by the square of the ratio of the OC diameter to the IC diameter, preferably near that of the OC multiplied by the square of the ratio of the OC diameter to the IC diameter. Operation at conditions greater than the above may lead to undesirable instability within the fluid, including the formation of undesired Taylor vortexes. Such is desirably avoided, and operation within the above limits controls, minimizes or eliminates the formation of such Taylor vortices. Concurrently, in preferred embodiments the RR moves at a rate which is about 5% lesser than, more preferably about 10%, 15%, 20%, 25%, 30%, 35%, 40%, 45%, 50%, 55%, 60%, 65%, 70%, 75%, 80%, 85%, 90%, or 95% lesser than or slower than the rotational rate of the IC. Concurrently, in preferred embodiments the RR moves at a rate which is about 5% great than, more preferably about 10%, 15%, 20%, 25%, 30%, 35%, 40%, 45%, 50%, 55%, 60%, 65%, 70%, 75%, 80%, 85%, 90%, or 95% greater than or faster than the rotational rate of the IC relative to the rotational rate of the OC of which it is proximate.

The dimensions of the annulus of the apparatus are not strictly limited and virtually any dimensions of the elements, viz., the inner cylinder, the outer cylinder and the one or more rotatable rings which can be constructed and operated in the manner described with one or more methods disclosed are satisfactory. Advantageously, the ratio of the height:diameter of the IC is at least about 3:1, and the ratio of the height:diameter of the OC is at least about 2:1. Advantageously the size of the distance between the outer wall of the IC and the inner wall of the OC is related to the length of the IC and/or the OC and relative thereto is at least about 2:1. While the thickness of the sidewall of the IC, the OC and the thickness of the RR are not critical they are preferably sufficient so that they do not unduly deform, or fail during operation of the apparatus. In certain embodiments the IC and the OC may be substantially cylindrical having a diameter and a length which is substantially consistent along its length and between its two ends. In other embodiments the IC and/or the OC may include a flange which extends substantially perpendicularly from one or both ends thereof, which flange may extend in the direction of the RR. Again, while not critical the length of the flange extending perpendicularly from the outer sidewall of the IC or the inner sidewall of the OC may be relative to the length of the respective IC or OC, and is preferably in the range of about 5% to about 50% of said length.

In preferred embodiments the sidewall of the IC and of the OC which is used to define the annulus is preferably substantially imperforate and may be smooth walled. By "substantially imperforate" is to be understood that at least about 95%, more preferably at least about 96%, 97%, 98%, 99% and most preferably about 100% of the surface area of these sidewalls which are in contact with the contents of the annulus is non-perforated. Preferably also, the surfaces of the rotatable rings RR are similarly preferably substantially imperforate and may be smooth walled.

In operation, the initial operating characteristics of the apparatus may be based on relative operating characteristics of prior art "solid-body" centrifuges, however thereafter the operation of the RR and their operating characteristics may be operated in a manner with respect to the IC and the OC such that improved separation characteristics may be achieved by operating the apparatus such that the operation of the RR relative to the IC and OC provides improved Taylor-Couette fluid flow (preferably liquid flow) profiles within the annulus. Particularly preferably the improved Taylor-Couette fluid flow characteristics are present at the ends of the IC and OC. To achieve such the RR, after a short period of initial movement (e.g., a 'start up phase') may be caused to move at a constant or variable rate, during which time one or both, but preferably both, of the IC and OC are moving as well.

The apparatus and methods of the present invention and the use of differentially rotatable cylinders in conjunction with one or more rotatable rings allows for extreme control over the separation efficiency of a composition, preferably a fluid composition present within the annulus of the apparatus. Also the use of differentially rotatable cylinders in conjunction with one or more rotatable rings allows for extreme control over the mixing efficiency in a composition, preferably a fluid composition present within the annulus of the apparatus and in particular permits for the generation of turbulence within the annulus, which may be subsequently controlled to return to a non-turbulent flow profile. The ability to generate non-turbulent and turbulent fluid flow profiles, as may be desired and with or without requiring transfer or any materials or composition into or out of the annulus, may be advantageous in industrial processes which may benefit from such sequential mixing and separation steps, which may be performed in any sequential order using an apparatus as described herein.

The apparatus and methods of the present invention and use of differentially rotatable cylinders in conjunction with one or more rotatable rings allows for extreme control over the fluid profile of a fluid composition present within the annulus of the apparatus, at any point within the annulus and/or interval of time. In accordance with the separation and/or mixing methods of the invention the apparatus may be operated to impose secondary circulation by using an asymmetry in the operation of the RR present which may eliminate or reduce the need for auxiliary methods or apparatus for imposing certain circulation patterns within the annulus, e.g, heat sources to impart thermal gradients, or pressure inducing devices (e.g, pumps) to induce counter flows.

While not usually desired during a process for separating compositions present within the annulus of the apparatus, it is nonetheless to be stated that the apparatus may be operated in a manner wherein a secondary fluid flow profile is caused by the apparatus. Such may for example be an Ekman fluid flow profile, which may be used to induce or cause circulation of the composition in a transverse direction which is perpendicular to the IC. Such a fluid flow profile may be desired if, for example, improved mixing or pumping is sought, such as where two or more chemical reactants are reacted within the annulus, or when the apparatus is operated in a pumping mode whereby a composition, or a fraction or part thereof may be moved to a particular part of the apparatus, e.g., into or in the proximity of a port, outlet or valve, such that it can be removed from the annulus. Such may be achieved by causing the IC and the OC to counter rotate and such is further facilitated when at least one RR at one end of the annulus rotates in the same direction as the IC, and when at least one RR at the other end of the annulus rotates in the same direction as the OC. The rotation of the RRs separated at the opposite ends of the annulus in opposite directions enhances the formation of an an Ekman fluid flow profile. Such an effect may be desired when mixing of the contents of the annulus is desired.

The apparatus and methods of the invention may be used in any of a number of technical or industrial processes wherein controlled separation and/or controlled mixing and/or a chemical reaction takes place. The apparatus and methods of the invention may be used in technical or industrial processes which currently use, or may use "solid-body" centrifugal separators. Non-limiting examples include: separation of milk products in the dairy industry; further processes in the processing of foodstuffs and beverages such as juice extraction, wine production such as the separation of solids in wines, woil-water separation processes; waste oil processing; separation of liquid plastics into separate fractions; waste water treatment (e.g, separation of solids from liquid waste streams); water recycling or water purification processes; the separation of mined products, e.g. ore and slurry separation processes; separation of metals from suspensions or slurries; separation of algae from fluids, suspensions or slurries, particularly as may be required in biofuel production processes and processing of spent nuclear fuels, While the methods and apparatus of the invention may be used in the treatment of any composition, preferably a they are used with fluid compositions, preferably a viscous fluid composition, e.g, gases, liquids, suspensions of solids in fluid or liquid phase, emulsions, gases entrained in a fluid, and the like. The methods and apparatus of the invention may be used to separate a composition into fractions or component parts of the said composition, non-limiting examples of which include; the separation of a composition based on differences in density; the separation of a composition based on differences in chemical composition; the separation of entrained gases from a liquid, the separation of suspended solids from a liquid or fluid medium, the separation of a chemical reaction product formed within the annulus from its initial reactants and/or a carrier medium, such as a non-reactive fluid, emulsified particles from a bulk fluid or bulk liquid phase. In preferred embodiments the methods and apparatus of the invention exclude the treatment of gases or fluids in which a gas is the primary component or fraction.

Figure 5:
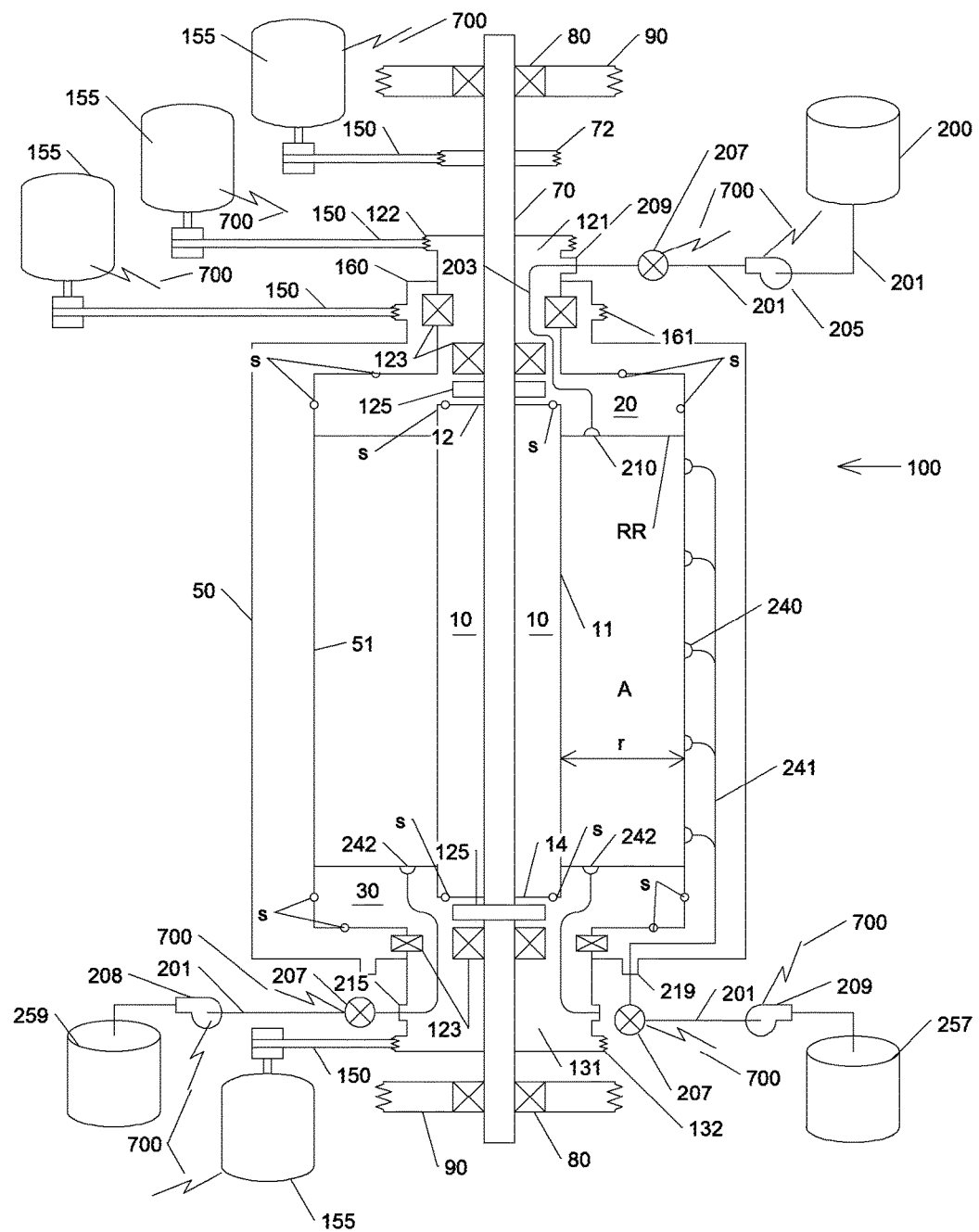
FIG. 5 illustrates in more specific detail a certain preferred embodiment of an apparatus useful with the methods of the invention.

FIG. 5 depicts an embodiment in a partial schematic view of an apparatus 100 according to the present invention. The depicted embodiment illustrates a version of the apparatus having a configuration's most similar to that according to FIG. 1, in that a single upper rotatable ring (RR) 20 and a single lower rotatable ring (RR) 30 is provided between the respective upper end 12 and lower end 14 of the of the inner cylinder (IC) 10 and the inner sidewall 51 of the outer cylinder (OC) 50. The inner cylinder 10 includes an outer sidewall 11 which is a substantially smoothed wall which faces inwardly to the annulus A, and wherein the outer cylinder 50 includes an inner sidewall 51 which faces inwardly to the annulus A. The inner cylinder 10 is fixed to a rotatable center shaft 70 which is mounted upon support bearings 80 at opposite ends thereof, which support bearings 80 are mounted upon a suitable framework structure 90 (only part of which is shown for illustrative purposes). Rotatably mounted upon the rotatable center shaft 70 via a central hub 121 is the upper rotatable ring 20 which is supported by suitable bearing 123 and an optional liquid seal 125 may also be present in this configuration, the inner cylinder 10 is rotatable separately from that of the hub 121 and its depending upper rotatable ring 20, and is in a liquid tight relationship thereto which can be provided by the inclusion of one or more seals "s" intermediate faces of the upper rotatable ring 20 and parts of the inner cylinder 10, in particular at the top 12 thereof. Similarly, a hub 131 is fixed to the lower rotatable ring (RR) 30 and is similarly mounted to the rotatable center shaft 70 by a similar bearing 123 and a further, yet optional liquid seal 125, is in liquid tight relationship with the lower end 14 of the inner cylinder 10, but is also freely rotatable relative thereto. Each of hubs 121, 131, and thus their depending rotatable ring RR, may be connected to a drive means which may be used to impart motion thereto. In the specific embodiment illustrated, each of the hubs 121, 131 includes a respective flange or peripheral channel 122, 132 in a part thereof, which may be use in conjunction with a drive belt 150 connected to an electrical motor 155 which may be individually controlled with respect to any other electrical motors present in the apparatus 100 via suitable signal transmission means 700 (e.g, wires, or wireless transmitter and/or receiver) to a general purpose controller device, and/or a programmed general purpose digital computer which may be used to regulate the operation of one or more of the motors 155, pumps 201 and valves 207. Thus, the rotational speed (rpm) and the direction of the motion of the elements may be suitably controlled. Similarly a flange or peripheral channel 72 may provided to the center shaft 70 and as well as a further belt 150 and electric motor 155, which may be used to drive the inner cylinder 10 independently of the upper rotatable ring 20 and the lower rotatable ring 30, as well as the outer cylinder (OC) 50. The outer cylinder 50 includes its own hub 160 from which depends the outer cylinder 50. The hub 160 is freely rotatably mounted via bearings 123 upon a part of the hub 121 of the upper rotatable ring 20, and upon further bearings 123 upon the part of the hub 131 of the lower rotatable ring 30, and a plurality of seals "s" is present in these elements to ensure a rotatable, yet a liquid tight fit between adjacent elements. The hub 160 of the outer cylinder 50 may also include respective flange or peripheral channel 161 and a part thereof, which similarly may be connected via an intermediate belt 150 to an electrical motor 155 which may be used to control the direction, and the speed of the rotating outer cylinder 50.

The methods of the invention to practice with an apparatus 100 is depicted on FIG. 5, which illustrates an illustrative, yet nonlimiting embodiment as the methods can be practiced with other apparatus described, although not necessarily depicted in any of the drawing figures.

With reference to FIG. 5, the apparatus 100 may be configured for providing a separation process. A composition is supplied from a suitable source 200 (which may be a container as shown, or may be an upstream supply or for that matter, any other source of the composition) and is fed via liquid conduit 201, e.g, a pipe, tube, and the like, and optionally utilizing a pump 205 and an optional control valve 207 via a fluid coupling 209 present in the hub 121 where it passes through the hub and into the annulus A via an inlet port 210. As is seen in figure, advantageously the inlet port is adjacent to come or near the proximity of the inner cylinder 10, The outer cylinder 50 includes one or more outlet ports 240 and in the depicted embodiment, series of outlet ports 240 are shown, interconnected via a further liquid conduit 241 which outlet ports 240 are present within the sidewall 51 of the outer cylinder 50 and/or an outlet port 242 which may be present in the lower rotatable ring 30; each of which are interconnected with a further liquid conduit 241. The liquid conduits 241 connected to outlet ports 240 (when present) may be used to remove a separation product from within annulus A. These liquid conduits 241 are in fluid communication with a further fluid coupling 219, which is in turn connected via further suitable liquid conduits 201 which may optionally be connected through one or more intermediate valves 219 and/or pumps to an optional collection vessel 257. Such outlet ports 240 are particularly useful in removing a denser separation product than that which may be present elsewhere within annulus, and particularly adjacent to the inner cylinder 10. In place of, or in addition to the outlet ports 240 and further downstream elements, there may be present one or more outlet ports 242 present within the lower rotatable ring 30. As is depicted in the figure, in this preferred embodiment the one or more outlet ports 242 are proximate or adjacent to the inner cylinder 10 and may be used to withdraw a further separation product, usually a less dense separation, from within the annulus which may be located radially inwardly (radius is depicted as "r') from the outer cylinder 50. The one or more outlet ports 242 is/are suitably connected to fluid conduits to a still further fluid coupling 219 which may optionally be connected through one or more intermediate valves 219 and/or pumps to an optional collection vessel 259.

In methods according to the invention, a composition is introduced into the annulus A, and thereafter the inner cylinder 10, outer cylinder 50 and the upper rotatable ring 20 and the lower rotatable ring 30 are placed into motion, e.g, using one or more of the electric motors 155. Preferably, both the inner cylinder 10 of the outer cylinder 50 are rotated in the same direction, such that the rotational rate of the inner cylinder is up to, but not more than, that of the outer cylinder times the square of the ratio of radius of the outer cylinder to that of the inner cylinder. During rotation of the inner cylinder 10 of the outer cylinder 50, the upper rotatable ring 20, lower rotatable ring 30 are also placed into motion, preferably in the same direction as both the inner cylinder 10 and the outer cylinder 50 but at a rotation speed intermediate to the foregoing, but both of upper rotatable ring 20 and the lower rotatable ring 30 move at the same rotational rate which initiates the improved separation of the composition within the annulus into two or more fractions or separation products. Advantageously the speed of the upper rotatable ring 20 and the lower rotatable ring 30 are at least about 5%, preferably at least about 10% less than that of the inner cylinder's rotational rate. More preferably the rotation rates of the intercellular, the outer cylinder, particularly the upper rotatable ring 20 and lower rotatable ring 30 are such that ideal or near ideal Taylor circular Couette motion is caused to occur in the annulus and across all, most of the radius "r", and in the regions of the rotatable rings RR. Such provides a superior separation of the composition into a less dense (or lower molecular weight) fraction or part which is proximate to the outer wall 11 of the inner cylinder 10, and the heavier, more dense (or higher molecular weight) fraction or part which is proximate to the inner wall 51 of the outer cylinder 50. Once a suitable degree of separation is achieved, the one or more outlet ports 242 and/or the one or more outlet ports 240 may be used to withdraw separate separation products from the annulus.

The apparatus of FIG. 5 may also be used in a method to provide intimate mixing of two compositions. Several variants on such a method are possible using the disclosed apparatus.

In the first variant, a quantity of a first composition is provided via the inlet port 210 to the annulus, followed by a quantity of a second composition to the annulus. Thereafter the annulus A is sealed, and the apparatus 100 operated in order to induce rapid mixing, most preferably turbulent flow characteristics within the annulus such that the first and the second composition are intimately mixed. After a sufficient degree of mixing the resultant mixture product may be withdrawn using any of the inlet port to 10, the one or more outlet ports 242 and/or the one or more outlet ports 240 as has been described previously.

In a second variant, in addition to the sequentially introduced first composition, second composition, may also be provided at least one further, e.g, third, ( . . . fourth, etc.) composition to the annulus and after the addition thereto, the apparatus may be used to provide intimate mixing in the manner described above.

In a third variant, the one or more first composition, second composition or for the compositions may be provided to the annulus via one or more of the outlet ports 240 (when present) and/or the outlet ports 242 (when present) which may be performed by reversing the direction of flow of the respective pumps 208, 209 while the respective first comes in, second composition and optionally further compositions are injected or otherwise provided to the annulus A, after which the apparatus may be used to provide intimate mixing the manner described above.

In a further method of the invention, the apparatus is operated to provide both a separation process step and a mixing process step, which steps may follow each other in any sequential order. For example, in one variant of such a method, to separate constituent provided to the annulus which constituents are reactive when contacted with each other. After being supplied to the annulus, the apparatus is operated to provide intimate mixing, during the chemical reaction between materials present in the separate constituents. After a suitable degree of reaction has occurred and/or sufficient interval of time has passed, the operation of the apparatus is subsequently modified to provide separation of the contents of the annulus, such that two or more reaction products can be withdrawn from the apparatus.

Figure 6:
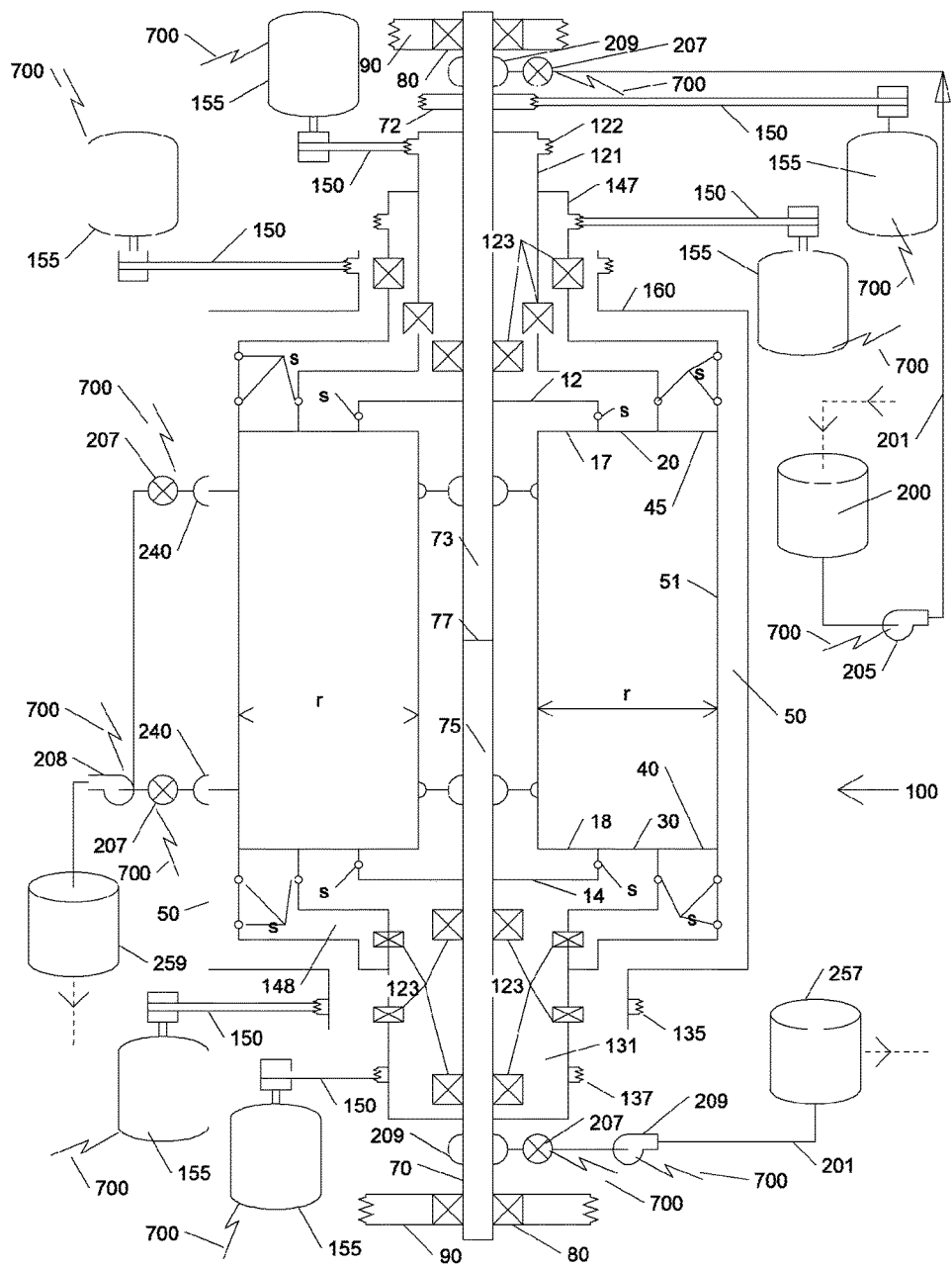
FIG. 6 depicts in more specific detail a further certain preferred embodiment of an apparatus useful with the methods of the invention.

FIG. 6 depict further embodiment of an apparatus 100 according to the present invention which, in many parts is similar to that described with reference to FIG. 5. Like elements are indentified using like numerals and/or letters in both FIGS. 5 and 6. The embodiment of FIG. 6 differs primarily in the fact in that there are present are four rotatable rings RR; an upper rotatable ring 20 and outwardly thereof a further upper rotatable ring 45 between the inner cylinder 10 and the outer cylinder 50, a lower rotatable ring 30 and outwardly thereof a further lower rotatable ring 40 also intermediate the inner cylinder 10 and the outer cylinder 50. The inner cylinder 10 further includes extending portions or flanges 17, 18, respectively at the upper end 12 and the lower end 14 thereof. The upper rotatable ring 45 depends from a hub 147 which is mounted on bearings 123 intermediate the hub 121 from which the upper rotatable ring 20 depends, and the hub 160 from which the outer cylinder OC 50 depends, and is thus freely and independently rotatable with respect to these further elements. In a similar manner, the lower rotatable ring 40 depends from a hub 148 which is mounted on the one side via bearings 123 to the hub 131 from which the lower rotatable ring 30 depends, and via further bearings 123. Suitable seals "s" may be present intermediate adjoining elements, such that a liquid tight, but moveable seal is maintained between the inner cylinder 10, the upper rotatable ring 20, the further upper rotatable ring 45, the lower rotatable ring 30, the further lower rotatable ring 40, and the outer cylinder 50, the spacing these elements defining the annulus A. As discussed previously, each of the foregoing hubs 122, 131, 147, 148, are connected to a drive means, e.g., a drive belt 150 connected to a suitable electrical motor 155. Such may be, for example, by corresponding respective flanges or peripheral channels 122, 132, 135, 137 in a part of one or the hubs 122, 131, 147, 148, which may be use in conjunction with a drive belt 150 connected to an electrical motor 155 which may be individually controlled with respect to any other electro-motors present in the apparatus 100. It is of course appreciated that any other drive means can be utilized, including a direct drive connection with a motor, engine, or other source of power which can be used to set one or more of the elements in motion, preferably rotational motion about the central shaft 70. Rotation of the central shaft 70, also is used to drive the motion or rotation of the inner cylinder 10 upon which it is (preferably) fixedly mounted.

In the depicted embodiment the center shaft 70 is hollow and includes an optional baffle wall 77 defining an upper hollow section 73 and a lower hollow section 75. The upper hollow section is connected via a suitable rotatable fluid coupling 209, to a liquid conduit 201, e.g, a pipe, tube, and the like, via an optional pump 205 and an optional control valve 207 to a composition present in a suitable source 200 (e.g, a vessel, or which may be an upstream supply or for that matter, any other source of the composition) such that the composition may be supplied via the upper hollow section through a part of the inner cylinder 10 and into the annulus via one or more fluid ports 210 present in the sidewall 11. Where the baffle wall 77 is present, a further composition, which may be the same or different than composition supplied from source 200 may be pumped from a further source, e.g, vessel 257 via an optional pump 209 and/or optional valve 207 to a further rotatable fluid coupling 209, via the hollow section 75 and thereafter into the annulus A via the further one or more fluid ports 210 present in the sidewall 11. (Conversely the contents of the annulus may withdrawn by reversing the direction of flow using the pumps 205, 209.) When a baffle is present, then two different compositions can be provided concurrently calmer sequentially to the annulus A. Wherein the baffle wall 77 is omitted, then a composition can be provided from either one or both of the source 200 or 257 to the annulus.

As is also depicted on FIG. 6, the outer cylinder 50 also includes ports 240 which are in fluid communication with the annulus A, are present as part of the outer cylinder 50, and part of the contents of the annulus A and may be withdrawn via one or more of such ports 240 via a liquid conduit 201, e.g, a pipe, tube, and the like, via an optional pump 208 and one or more optional control valves 207 and to a an optional collection vessel 259.

The embodiment of the apparatus is depicted on FIG. 6 may be operated in a manner generally described with reference to FIG. 5, and may be operated in order to provide both separation and/or mixing of the contents present within the annulus. The embodiment of FIG. 6, having four rotatable rings RR provides for a higher degree of control over the fluid flow characteristics present within the annulus during its operation.

Such may be particularly advantageous with certain processes.

Figure 7:
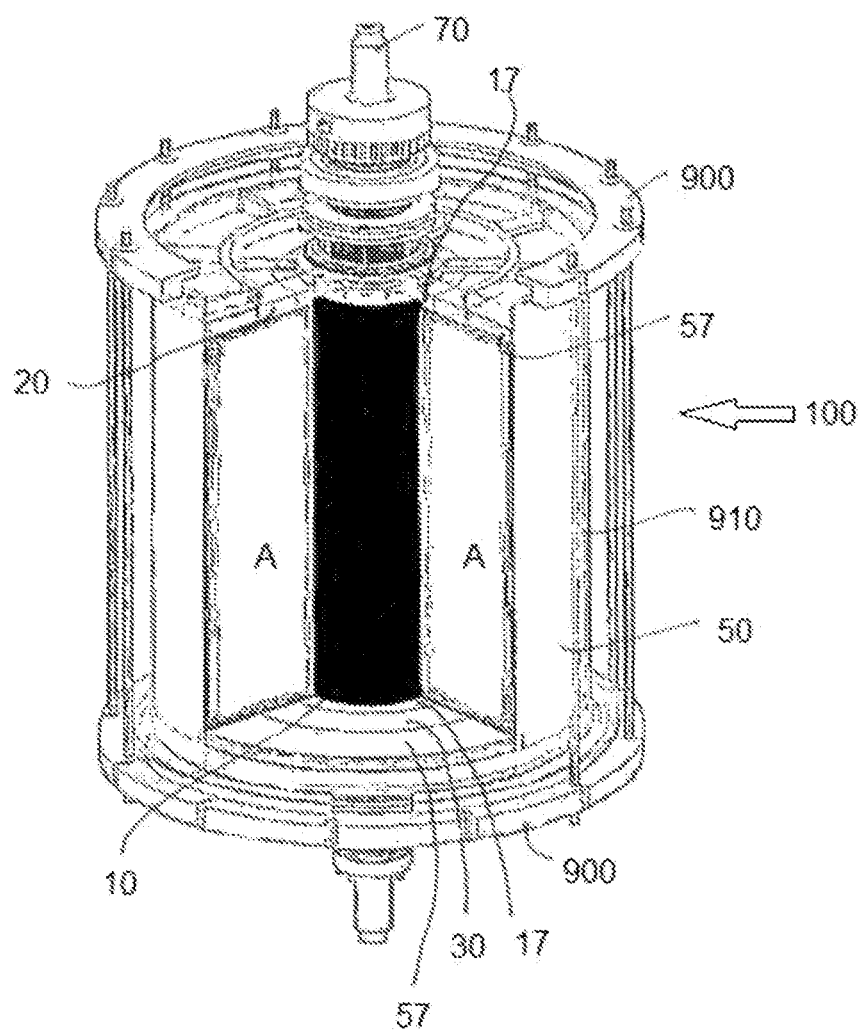
FIG. 7 illustrates a partial cut-away view of a certain preferred embodiment of an apparatus useful with the methods of the invention.
Figure 8A:
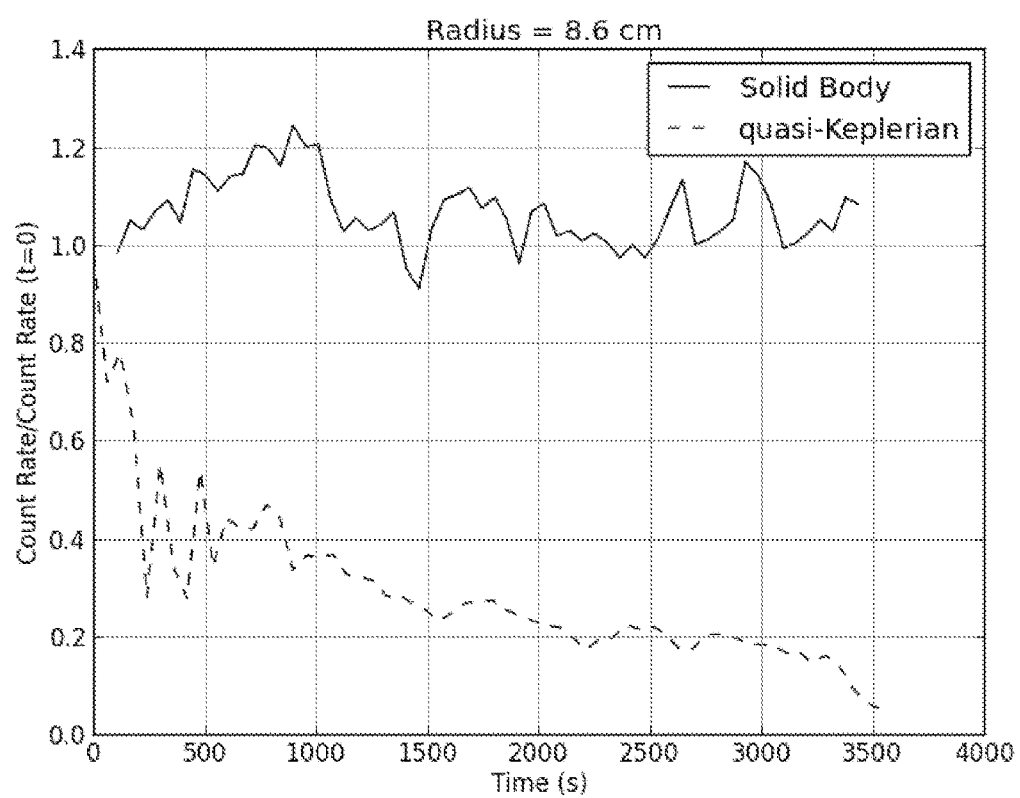
FIGS. 8A-8H depict experimental results regarding the distribution of particles within the apparatus of FIG. 7 at various radii and at various time intervals.
Figure 8B:
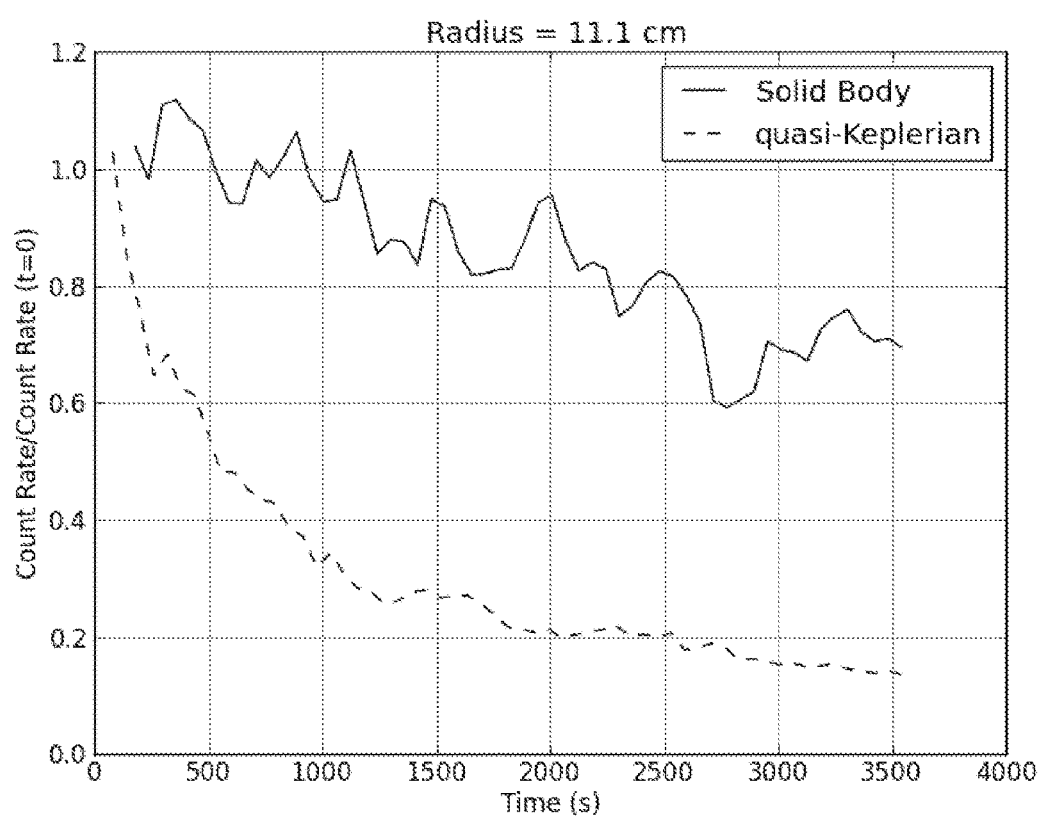
Figure 8C:
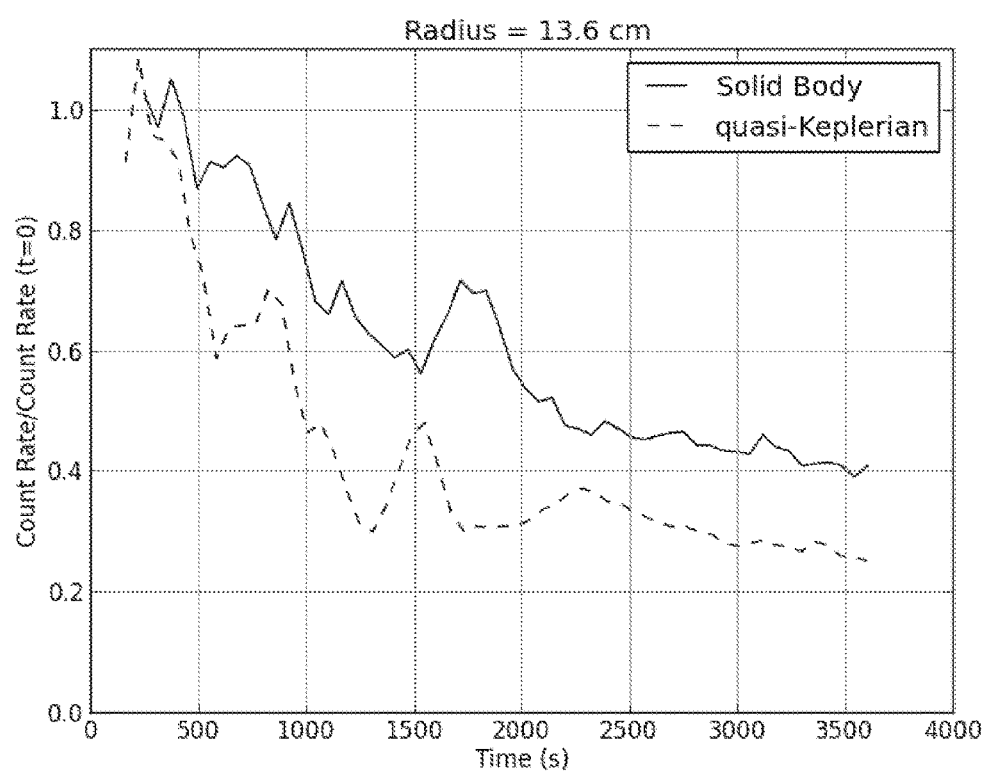
Figure 8D:
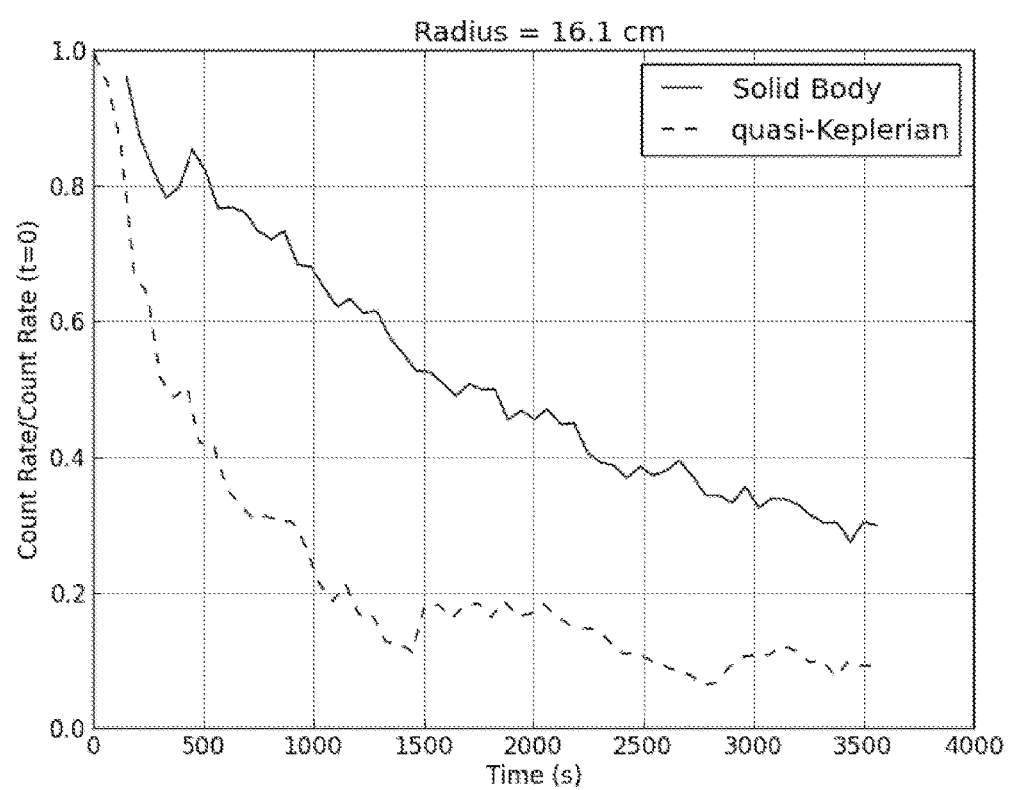
Figure 8E:
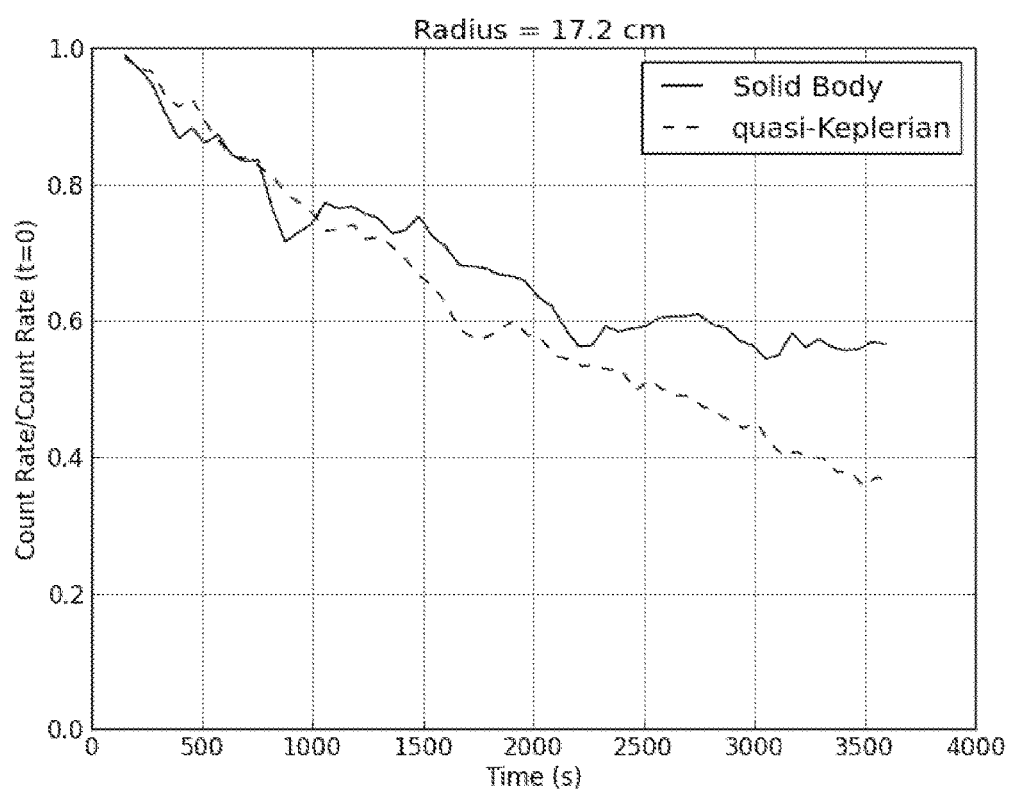
Figure 8F:
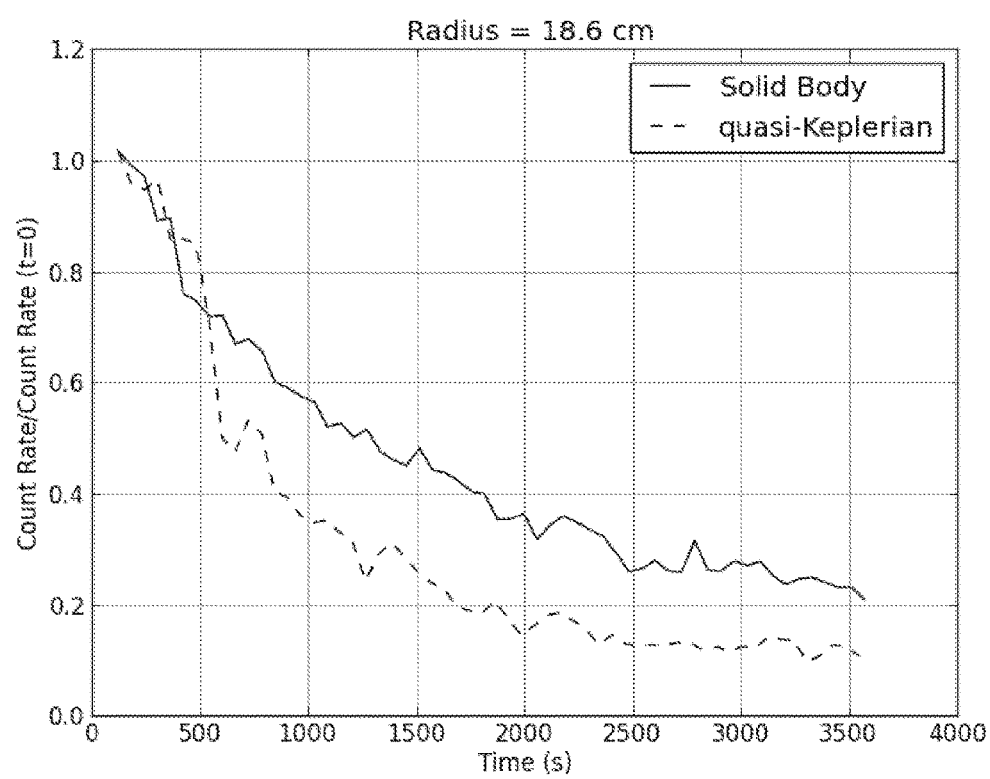
Figure 8G:
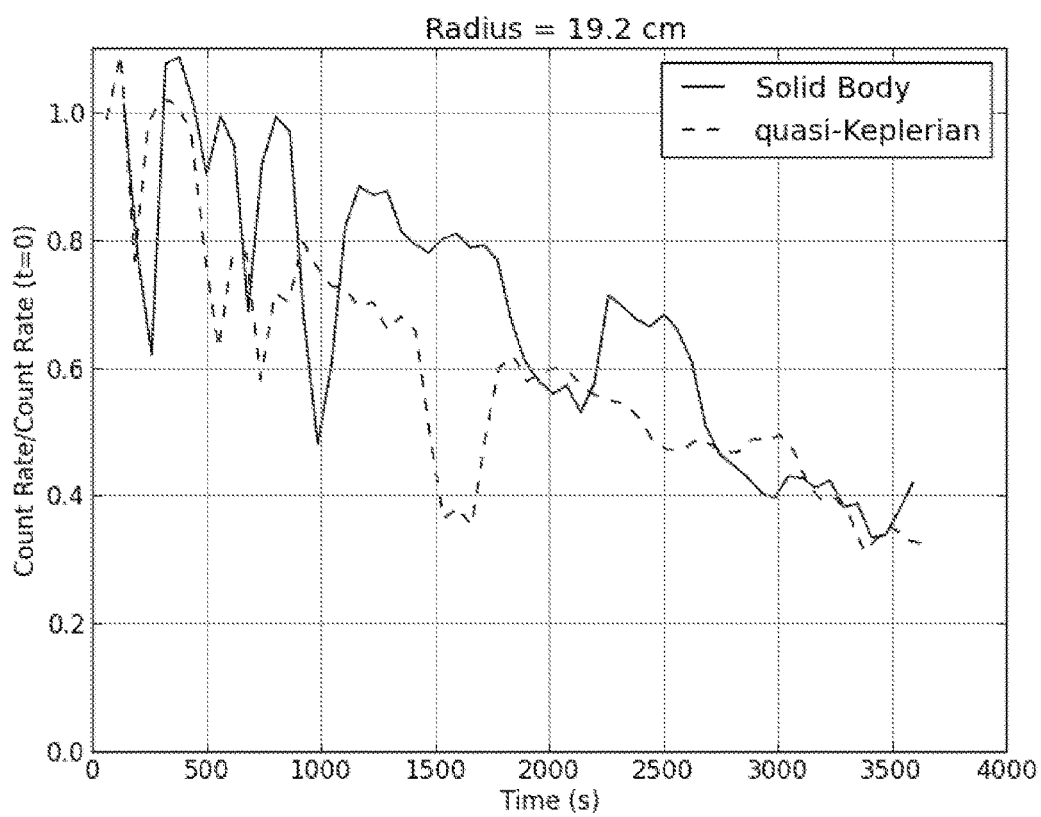
Figure 8H:
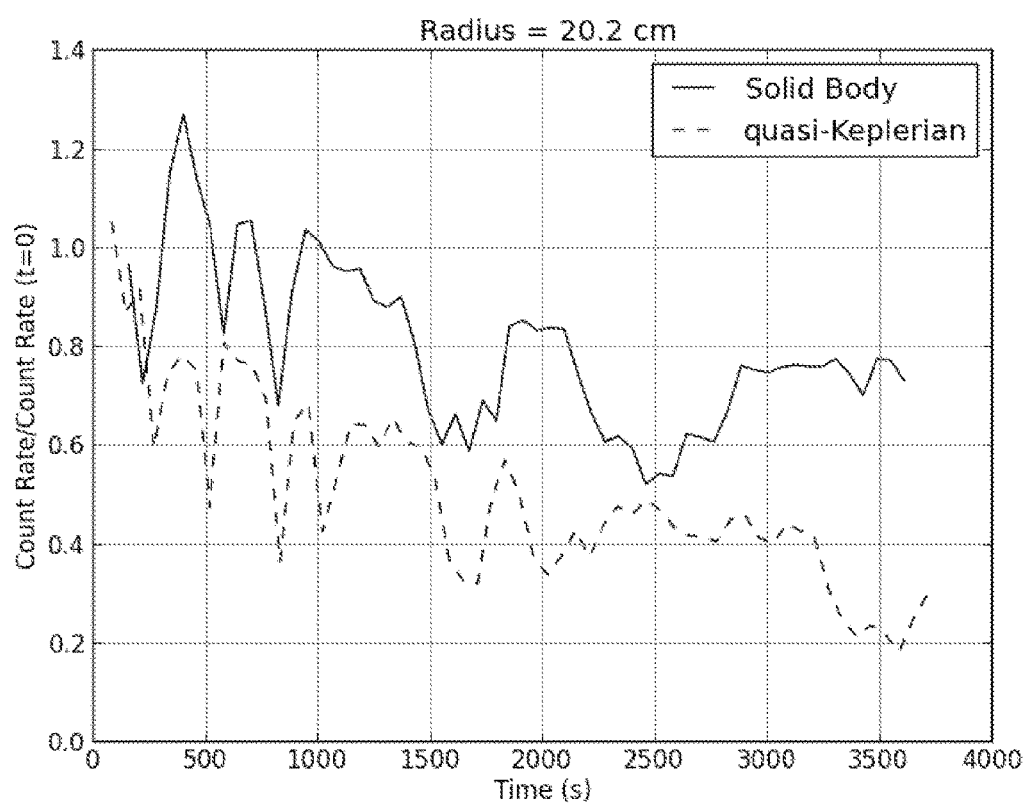

A partial cross-sectional view of a further apparatus 100 according to the invention is depicted on FIG. 7. In this partial perspective, partial cutaway view a visible the inner cylinder 10 and its flanges 17 extending radially outward from the central shaft 70, rotatable rings RR, namely an upper rotatable ring 20 and a lower rotatable ring 30 Jason's and abutting the flanges 17, and thereafter radially outward the flanges 57 of the outer cylinder 50, which are all present within an enclosure 910 which provides a liquid-tight seal and encases the foregoing elements of the apparatus 100. The housing 910 and its elements are contained in supported by an external frame 900 which maintains the structural rigidity of the foregoing elements.

EXAMPLE

The method of separating a boy particulate material in water was performed utilizing an apparatus is described reference to FIG. 7. The dimensions of the elements were as follows:

inner cylinder: height 39.7 cm, diameter 3.8 cm flange of inner cylinder: diameter 15.8 cm dimensions of upper and lower rotatable rings: inner diameter 7.9 cm, outer diameter 13.4 cm outer cylinder: height 39.37 cm, diameter 40.6 cm.

The distance from the outer wall of the inner cylinder to the inner wall of the outer cylinder was 13.4 cm.

The materials of the outer cylinder, and the rotatable rings were of a transparent acrylic material which allowed for visual observation of the contents of the annulus. The foregoing elements were all provided in a liquid-tight seal relationship with regard to adjacent elements, yet all of the foregoing elements were independently rotatable both directionally, and with regard to relative speeds.

The separation was performed as follows. Water at a temperature of 20° C. was supplied to the apparatus, reflective tracer particles were added to the water, and drive means were engaged. These tracer particles where silver coated hollow glass spheres which had a mean particle size of 16 microns in diameter, and the said particles exhibited a density of 1.6 times that of water. The inner cylinder was operates rotated a speed of 700 rpm, the rotatable rings were operate to rotated to speed of 370 rpm, and the outer cylinder was operated to rotated speed of 100 rpm with all of the foregoing rotating in a clockwise direction. Such established a fluid flow profile according to preferred methods of the invention which was termed "quasi-Keplerian" fluid flow. After three minutes a commercial laser Doppler velocimeter (a mini LDV-G5-240, class 3b laser, 658 nm, at 31 mW, ex. Measurement Science Enterprise) was turned on to measure the speed of reflective tracer particles in an interrogation volume of several $mm^3$ located at a position inside the annulus determined by adjusting the position of the velocimeter relative to the annulus. The concentration of tracer particles as a function of time in the interrogation volume is determined by noting the timestamp of each velocity measurement made asserting that the concentration is proportional to the velocity measurement count rate. After a measurement of a particular interrogation volume is complete, the water, along with the reflective tracer particles, is purged from the apparatus and the process is repeated after repositioning the velocimeter. Sampling of particles present at various radii was performed at the half-height (midplane) from time=0 to time=approx. 3500 seconds, at radial distances measured outwardly from the center line (or center of the shaft) to determine the concentration of the particulates at that radial distance as a function of time. These distances were: 8.6 cm, 11.1 cm, 16.1 cm, 17.2 cm, 19.2 cm and 20.2 cm. These results are indicated on the several graphs of FIG. 8A-8H.

COMPARATIVE EXAMPLE

The foregoing apparatus was used, test repeated as described above with reference to the "Example", except that the rotational speed of each of the inner cylinder, outer cylinder, and rotatable rings was 100 rpm. Such was a "solid-body" mode of operation. Sampling was performed in the same manner as described above, these results are also indicated on the several graphs of FIG. 8A-8H.

Consideration of the reported results of FIGS. 8A-8H indicate that over most the radial distance extending between the outer wall of the inner cylinder to the inner wall of the outer cylinder a more precise segregation of the particulates was observed to be present which indicated a much superior separation as compared to the operation under a "solid-body" mode of operation. This can be understood when considering that each of FIGS. 8A-8H depict the concentration of the tracer particles at a particular radial distance from the outer wall of the inner cylinder (IC) (corresponding to "r" in FIGS. 5, 6) over a period of time. Note is to be made that as indicated on the abscissa of each of graphs presented as FIGS. 8A-8H that reported "count rate", indicative of the number of particles present at the specific radius is normalized with respect to the particles at a time approximately equal to t=0 sec., more properly after several initial revolutions of the IC, RRs and OC which provided an initial distribution within the annulus. With respect to the time intervals from the start of each graph, a faster delay of concentration at the specific radius indicates a more efficient removal of the originally present (and denser than water) tracer particles within the annulus as time progressed. Thus the results reported as graph lines for "quasi-Keplerian" flow which is in accordance with the practice of methods of the present invention as illustrated in FIGS. 8A-8H when cumulatively considered demonstrate a more efficient separation of the higher density tracer particles, and their faster migration to the proximity of the outer cylinder (OC) than to the comparative results. Such demonstrates superior separation characteristics provided by the apparatus operating according to a separation method of the invention operating to provide a quasi-Keplerian fluid flow profile.

The invention claimed is:

1. A method of separating a composition into two or more component fractions or parts, comprising:
   providing the composition to an apparatus which comprises an annulus for the containment of a composition which annulus exists between an a rotatable inner cylinder, a rotatable outer cylinder, and one or more rotatable rings which extend between the inner cylinder and the outer cylinder, which aforesaid elements are all independently rotatable, with respect each other, such that a liquid can be retained within the annulus when one or more of these elements are in motion,
   operating the apparatus so that the rotational speed of at least one of the inner cylinder, outer cylinder and one or more rotational rings move at a speed which is different from the speed of one or more of the other inner cylinder, outer cylinder and one or more rotational rings present within the device such that over an interval of time, the distribution of components present within a composition between the inner cylinder and the outer cylinder changes due to the motion of one or more of the elements of the apparatus (separation).

2. The method according to claim 1 wherein the operating speed of the one or more rotational rings is intermediate to the operating speed of the inner cylinder and of the outer cylinder.

3. The method according to claim 2 wherein the relative rotational rate of the inner cylinder relative to the outer cylinder is from about that of the outer cylinder to no greater than that of the outer cylinder multiplied by the square of the ratio of the outer cylinder diameter to the inner cylinder diameter.

4. The method according to claim 1, wherein the relative rotational rate of the inner cylinder relative to the outer cylinder is within about +/−25% of the rotational rate of the outer cylinder multiplied by the square of the ratio of the outer cylinder diameter to the inner cylinder diameter.

5. A method of mixing two or more separate compositions to form a mixture, comprising: providing the separate compositions to an apparatus which comprises an annulus for the containment of a composition which annulus exists between an inner cylinder, an outer cylinder, and one or more rotatable rings which extend between the inner cylinder and the outer cylinder, which aforesaid elements are all independently rotatable, with respect each other, and in which a liquid tight seal is present between adjacent elements such that a liquid can be retained within the annulus when one or more of these elements are in motion; operating the apparatus so that the rotational speed of at least one of the inner cylinder, outer cylinder and one or more rotational rings move at a speed, which is different from the speed of one or more of the other inner cylinder, outer cylinder and one or more rotational rings present within the device such that over an interval of time, the distribution of components (mixture) present within a composition between the inner cylinder and the outer cylinder changes due to the motion of one or more of the elements of the apparatus.

6. The method according to claim 5 wherein the operating speed of the one or more rotating rings is intermediate to the operating speed of the inner cylinder and of the outer cylinder.

7. The method according to claim 6 wherein the relative rotational rate of the inner cylinder relative to the outer cylinder is from about that of the outer cylinder to no greater than that of the outer cylinder multiplied by the square of the ratio of the outer cylinder diameter to the inner cylinder diameter.

8. The method according to claim 5, wherein the relative rotational rate of the inner cylinder relative to the outer cylinder is within about +/−25% of the rotational rate of the outer cylinder multiplied by the square of the ratio of the outer cylinder diameter to the inner cylinder diameter.

9. A method of performing a chemical reaction and/or enhancing, and/or controlling a chemical reaction within a composition, comprising: providing one or more compositions to an apparatus which comprises an annulus for the containment of a composition which annulus exists between an inner cylinder, and outer cylinder, and one or more rotatable rings which extend between the inner cylinder and the outer cylinder, which aforesaid elements are all independently rotatable, with respect each other, and in which a liquid tight seal is present between adjacent elements such that a liquid can be retained within the annulus when one or more of these elements are in motion; operating the apparatus so that the rotational speed of at least one of the inner cylinder, outer cylinder and one or more rotational rings move at a rotational velocity which is different from the speed of one or more of the other inner cylinder, outer cylinder and one or more rotational rings present within the device such that during the operation of the apparatus, one or more chemical reactions occur within the annulus to form one or more reaction products.

10. The method according to claim 9 wherein the operating speed of the one or more rotatable rings is intermediate to the operating speed of the inner cylinder and of the outer cylinder.

11. The method according to claim 10 wherein the relative rotational rate of the inner cylinder relative to the outer cylinder is from about that of the outer cylinder to no greater than that of the outer cylinder multiplied by the square of the ratio of the outer cylinder diameter to the inner cylinder diameter.

12. The method according to claim 9, wherein the relative rotational rate of the inner cylinder relative to the outer cylinder is within about +/−25% of the rotational rate of the outer cylinder multiplied by the square of the ratio of the outer cylinder diameter to the inner cylinder diameter.

13. A method according to claim 1, wherein the method is used in a process selected from the group consisting of: separation of milk products in the dairy industry; the processing of foodstuffs and beverages, juice extraction, wine production; the separation of solids in wines, oil-water separation processes; waste oil processing; separation of liquid plastics into separate fractions; waste water treatment; water recycling or water purification processes; the separation of mined products; separation of metals from suspensions or slurries; separation of algae from fluids, suspensions or slurries; biofuel production processes and processing of spent nuclear fuels.

14. The method of claim 1, wherein, subsequent to the separation, two different separation products, which have different compositions and/or concentrations than one or more of the components previously provided to the apparatus and prior to the separation are withdrawn from the annulus.

15. The method of claim 5, wherein, subsequent to the mixing,
one or more mixture product(s) formed within the annulus from the separate compositions previously provided to the apparatus are withdrawn from the annulus.

16. The method of claim 9, wherein, subsequent to the chemical reaction and/or enhancement of and/or control of a chemical reaction, one or more reaction product(s) formed within the annulus are withdrawn from the annulus.

* * * * *